Sept. 2, 1969 J. E. STONE 3,465,286
SEISMIC SYSTEM WITH A RADIO COMMUNICATIONS LINK CONNECTING
THE OPERATING AND SEISMIC WAVE GENERATING STATIONS
Filed July 5, 1968 4 Sheets-Sheet 1
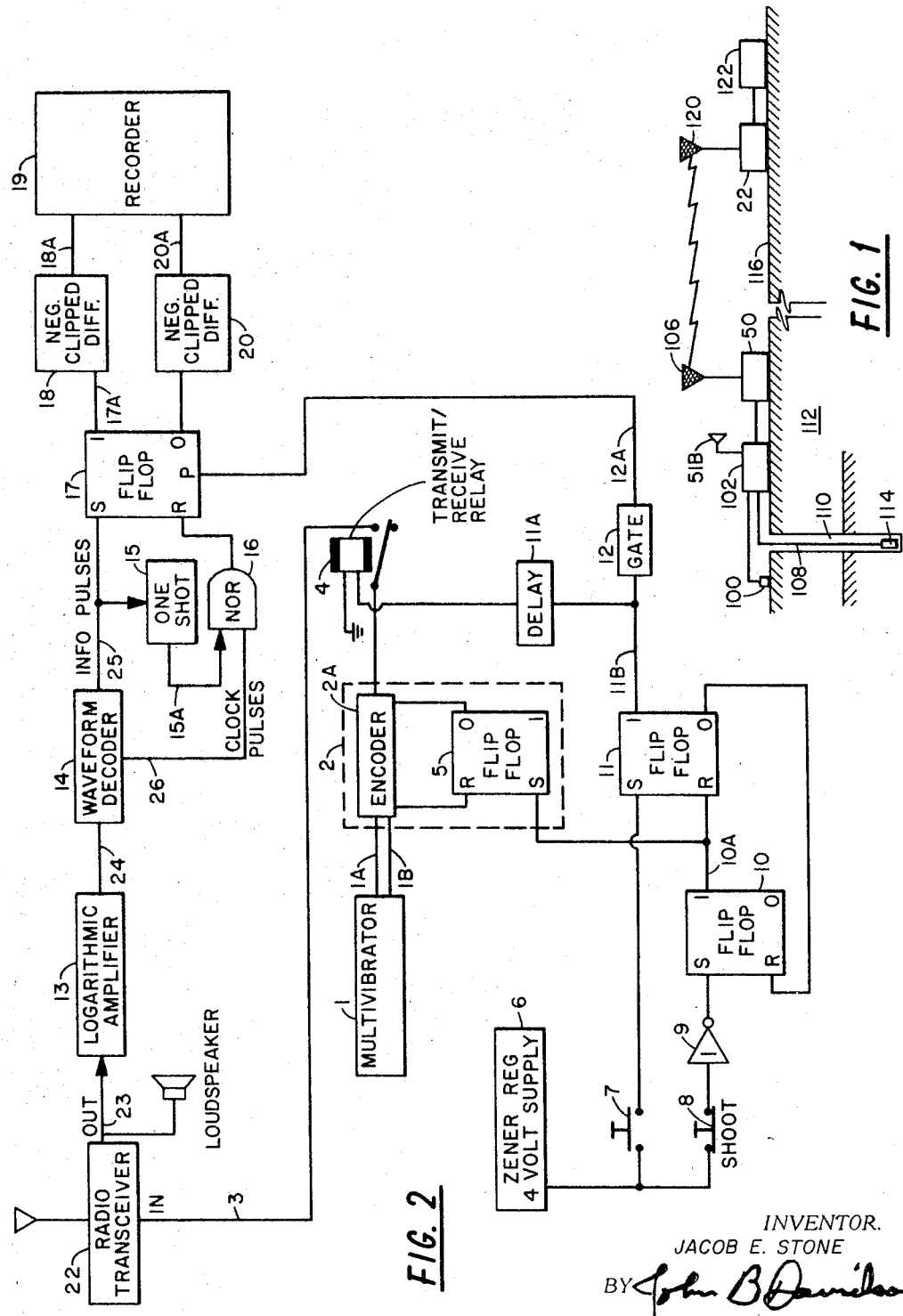
INVENTOR.
JACOB E. STONE
BY John B Davidson
ATTORNEY Sept. 2, 1969   J. E. STONE   3,465,286
SEISMIC SYSTEM WITH A RADIO COMMUNICATIONS LINK CONNECTING
THE OPERATING AND SEISMIC WAVE GENERATING STATIONS
Filed July 5, 1968   4 Sheets-Sheet 2

INVENTOR.
JACOB E. STONE
BY John B. Davidson
ATTORNEY

Sept. 2, 1969 J. E. STONE 3,465,286
SEISMIC SYSTEM WITH A RADIO COMMUNICATIONS LINK CONNECTING
THE OPERATING AND SEISMIC WAVE GENERATING STATIONS
Filed July 5, 1968 4 Sheets-Sheet 3

JACOB E. STONE INVENTOR.

BY John B Davidson

ATTORNEY

INVENTOR.
JACOB E. STONE
BY John B Davidson
ATTORNEY

United States Patent Office 3,465,286
Patented Sept. 2, 1969

3,465,286
SEISMIC SYSTEM WITH A RADIO COMMUNICATIONS LINK CONNECTING THE OPERATING AND SEISMIC WAVE GENERATING STATIONS
Jacob E. Stone, Bellaire, Tex., assignor to Esso Production Research Company, a corporation of Delaware
Filed July 5, 1968, Ser. No. 742,697
Int. Cl. G01v 1/16, 1/22
U.S. Cl. 340—15.5          5 Claims

ABSTRACT OF THE DISCLOSURE

Apparatus for controlling seismic energy sources utilizes a communications link between operating site and seismic wave generating site. Seismic waves can be initiated at the generating site only when a fixed predetermined number of pulses is transmitted from the operating site. Break time and time of arrival of initial seismic waves at the earth's surface are transmitted to operating location by changing frequency of a pulse train produced at disturbance location. Reception of extraneous signals at transmitting location are ineffective to actuate the seismic source.

Background of the invention

This invention relates generally to seismic prospecting and more particularly to apparatus for controlling seismic prospecting operations from a single operating position.

The general method of geophysical prospecting utilizing seismic waves is well known. Briefly stated, the method comprises the steps of initiating a seismic impulse at or near the surface of the earth, and recording signals generated by seismic detectors as a result of earth movement at one or more points more or less spaced from the point of origin of the seismic disturbance. The recordation must permit measurement of the time elapsing between the instant of the origination of the impulse and of the generation of signals as a result of subsequent earth movement. The original impulse will set up elastic waves that are transmitted through the earth. Any discontinuity or variation of structure in the earth will reflect and/or refract a portion of the energy in the downgoing seismic waves so that a recording of the signals from the receiving points will comprise a number of arriving traces or individual records each derived from the original disturbance and each differing from the others in time of arrival, magnitude, and wave shape, or all three.

When explosive charges are used as the source of energy for the impulse, it is customary to explode the charges at or near the bottom of a shothole drilled through the weathered layer of the earth surface. In order to accurately determine the depth of subsurface interfaces, it is necessary to know the travel time of seismic waves through the weathered layer. For this reason a separate geophone (termed as TSP geophone) is positioned near the opening of the shothole at the earth's surface for the specific purpose of detecting first arrivals so that the travel time of seismic waves traveling substantially vertically from the explosive charge through the weathered layer can be measured.

It is also necessary to correlate the operation of the seismic wave recorder with the detonation or initiation of the seismic disturbance. To this end it is customary to initiate the seismic disturbance by means of an electric circuit including a cam-actuated switch or other device on the recorder to produce an impulse indicative of the "break time" or instant at which the disturbance is initiated and to record this impulse. The customary means for conveying seismic signals back and forth between the recording location and the shothole has been by means of electric cables. Manifestly, when it is necessary to position a recording truck at a considerable distance from a shothole, the use of cables is most inconvenient and costly. It is desirable to use a wireless communications link, such as a radio link, for this purpose. It is also desirable that the communications link use only one transmitter and one receiver at each end thereof and that only a single radio frequency be used for conveying information back and forth between the two locations. Prior art apparatus for this purpose is described in the following U.S. patents: 3,225,858, Pfab; 3,220,503, Oakley; and 3,316,996, Ball et al. The apparatus described in U.S. Patent 3,316,996 has been found to be particularly satisfactory. However, it is desirable to make such apparatus as troublefree and as foolproof as possible. On occasion, even with the apparatus described in Patent 3,316,996, interfering radio waves in the communications link can produce signals that will either give spurious indications of break time and uphole geophone seismic wave detection, or will actually prematurely detonate the seismic charge. Therefore, it is desirable to make the apparatus insensitive to interfering signals from extraneous sources.

Summary of the invention

In accordance with the present invention, apparatus for controlling the initiation of a seismic disturbance from a remote location includes a communications link between the remote location and the location at which it is desired to produce a seismic disturbance. Electrical signal generating means for normally producing an electrical signal of one frequency and for changing the signal to a second frequency for a predetermined number of consecutive cycles responsive to an activating signal thereto is connected to the communications link at the remote terminal by an apparatus adapted to selectively connect the output signal of the signal generating means to the communications link. At the transmitting location there is provided a control means connected to the communications link for producing a control signal when and only when an electrical signal of the second predetermined frequency is received at the signal generating terminal of the communications link for said predetermined number of consecutive cycles. Connected to the control means there is provided apparatus for actuating the seismic wave generating means responsive to the control signal. Connected to the signal generating means, there is further provided apparatus for producing the activating signal therefor.

In accordance with a specific aspect of the invention there is also provided seismic wave detecting means to detect the seismic waves produced at the source, preferably at the earth's surface in the immediate vicinity of a shothole. The second signal generating means is connected to the communications link at the seismic wave disturbance terminal thereof for normally producing an electrical signal of a first frequency, and for changing the electrical signal to a second frequency responsive to a first activating signal applied thereto, and for returning the signal to the first frequency responsive to a second activating signal applied thereto. The seismic wave generating means is connected to the second signal generating means through a first circuit means, said first circuit means being adapted to produce the first activating signal for the second signal generating means responsive to activation of the seismic wave generating means. A second circuit means is connected to the detecting means and to the second signal generating means for producing the second activating signal therefor responsive to detection of seismic waves of at least predetermined amplitude by the detecting means. There is further provided means at the remote location connected to the communications link for producing a first time recordation of frequency changes in the signal produced by the second signal generating means.

Brief description of the drawings

Objects and features of the invention not apparent from the above discussion will become evident upon consideration of the following detailed description thereof when taken in connection with the accompanying drawings wherein FIG. 1 is an elemental schematic diagram of apparatus for making a seismic observation in accordance with the invention; FIG. 2 is a more detailed electrical schematic diagram of apparatus for use at the remote control location illustrated in FIG. 1.

Figure 3:
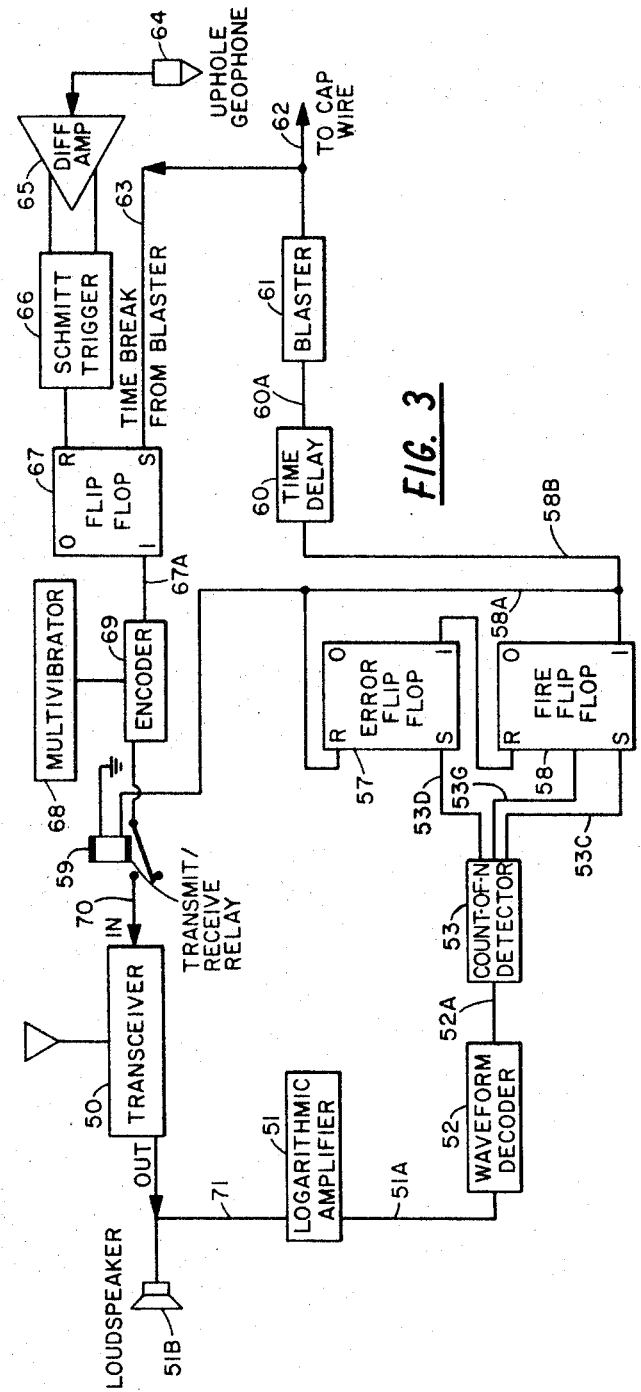
FIG. 3 is a more detailed electrical schematic diagram of apparatus for use at the shothole location illustrated in FIG. 1.

With reference now to FIG. 1, there is illustrated a shothole 110 drilled in the earth from the earth's surface 116 to a location below the weathered layer 112 of the earth. An explosive charge 114 at the bottom of the shothole 110 is for the purpose of producing a seismic impulse when it is detonated. The detonation of the seismic charge 114 is controlled by control apparatus 102 connected to the charge by electrical lead 108. A radio receiver and transmitter unit 50 having an antenna 106 is electrically connected to the control apparatus 102 for controlling the operation thereof in accordance with radio signals received thereby and for transmitting information from control unit 102 to a remote location by means of radio signals. A TSP geophone 100 also is connected to the control apparatus 102. The signals from jeophone 100 are used to modulate the signal transmitted to a remote location by unit 50.

At a remote location from the shothole 110 there is positioned a remote control unit 122 connected to a radio receiver and transmitter 22 having an antenna 120. The frequency of operation of the radio units 50 and 22 is assumed to be such that the receiver of unit 50 is tuned to the transmitting frequency of unit 22 and that the receiver of unit 22 is tuned to the transmitting frequency of unit 50. Preferably the same frequency is used by the transmitting sections of radio units 50 and 22, although it is to be understood that two frequencies may be used if such is feasible and desirable.

The remote control unit 122 is used to produce signals, which may be termed arming signals and firing signals, for the control of control unit 102. The arming signals actuate loudspeaker 51B to warn the operator at the shothole location that the remote control operator is ready to initiate a seismic impulse. The remote control operator thereafter closes a switch in unit 122 which initiates the firing signal. The firing signal is transmitted to the shothole location immediately after the arming signal so that a timing operation is initiated causing explosive charge 114 to be detonated. A timebreak signal occurs at the time of detonation of charge 114 and is produced in control unit 102. Concurrently with the start of the timing operation, radio unit 50 switches from the receive mode to the transmit mode thereof and the radio unit 22 switches from the transmit mode to the receive mode thereof so that the timebreak signal is transmitted from the shothole location to the remote location whereat it is received and recorded on a convenient seismic recorder. The transmission process from radio unit 50 continues for a brief period of time after the charge has been detonated at which time control unit 102 causes the radio 50 to return to the receive mode. Both radios will then remain in the receive mode until a new transmission cycle is initiated by one of the operators.

The operation of the apparatus of the control units of FIGS. 2 and 3 will be best understood by a description of the operating cycle thereof. Let it be assumed that the apparatus illustrated in FIGS. 2 and 3 has been electrically energized and that multivibrators 1 and 68 are producing trains of rectangular wave pulses of a convenient frequency, for example at a pluse repetition rate of two kilocycles. (For the purposes of this description, the terms "frequency" and "pulse repetition rate" are used interchangeably.) The multivibrators are respectively coupled to encoders 2 and 69 by independent lines transmitting both true and complementary signals; i.e., rectangular wave signals having opposite wave forms. Referring to FIG. 2, the true signal from multivibrator 1 to encoder 2 is transmitted on line 1A and the complementary signal is transmitted on line 1B. The function of encoder 2 is to produce a signal on line 2A having a given frequency (e.g. one kc.) under normal circumstanes and having twice that frequency when an activating signal is applied thereto on line 10A. Similarly under normal circumstances, encoder 69 will produce an output signal of a given frequency such as one kc., and will produce an output signal of twice that frequency when an activating signal appears on line 67A. Suitable apparatus for use as encoders 2 and 69 will be described below with respect to FIG. 4. Initially the various FLIP-FLOP and associated circuits will be in their reset condition. Pushbutton switch 7 (see FIG. 2) is closed momentarily to apply the regulated voltage from regulated voltage power supply 6 to the set circuit of FLIP-FLOP 11. After a short time delay (which is immaterial at this stage) provided by delay circuit 11A, the transmit-receive relay 4 is energized to apply the signal appearing on line 2A to the radio transmitter-receiver 22 through line 3. The transmitter-receiver units 22 and 50 may be a conventional transceiver type radio communications unit such as is used in radio communications links for seismic prospecting, typically model U43LLT–1000 manufactured by Motorola Communication and Electronics Inc. A signal appearing on line 3 will not only modulate the transmitting portion of the transceiver 22 but also will deactivate the receiver portion thereof while removal of the signal on line 3 will switch the transceiver unit back to its receiving position. The output signal from FLIP-FLOP 11 is also applied to the initial reset circuit P of FLIP-FLOP 17 through a gate 12 and line 12A.

Figure 6:
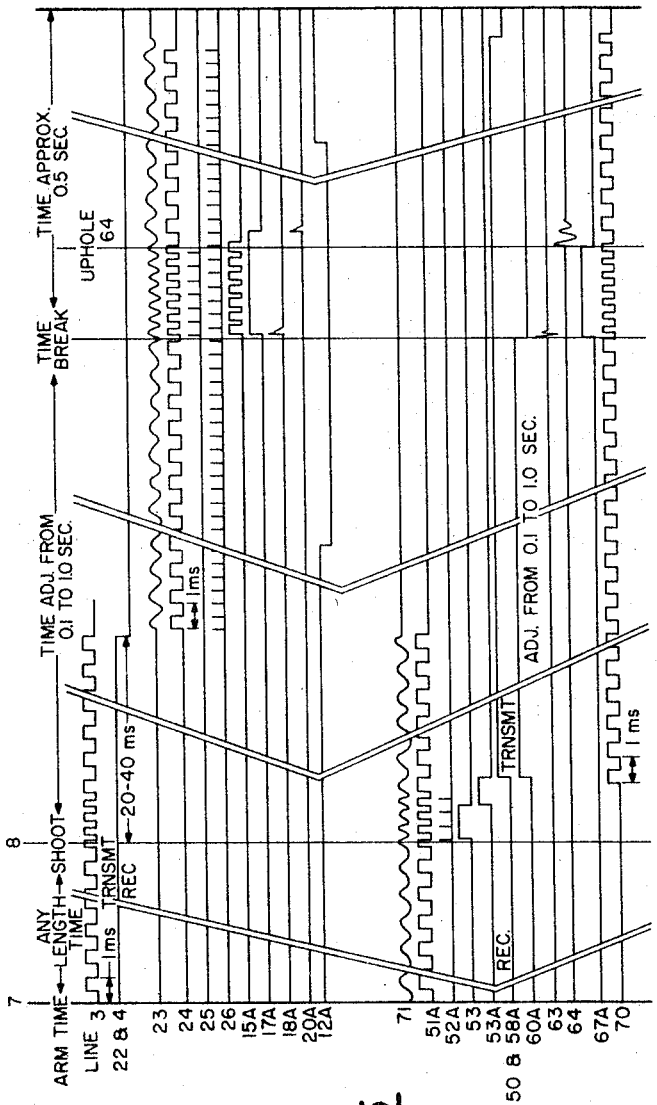
FIGS. 6 and 7 are waveform illustrations useful in understanding the operation of the apparatus described in FIGS. 2 through 5.
Figure 7:
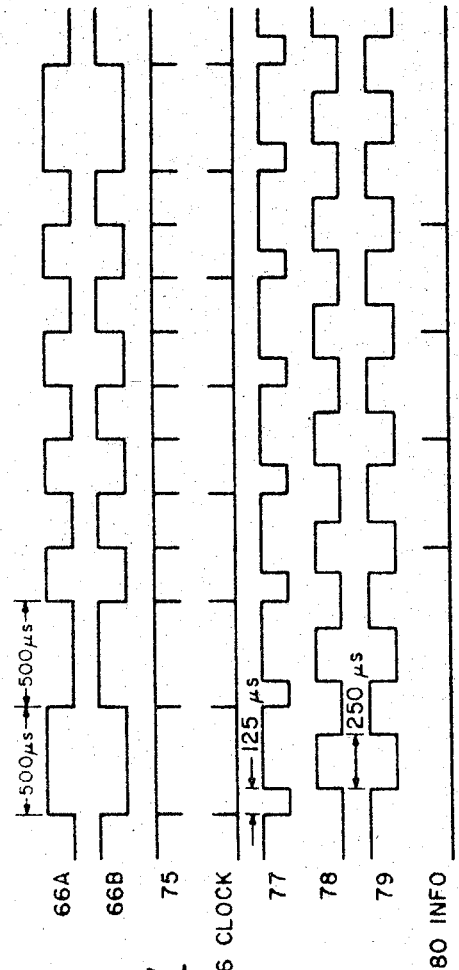

At this point, it should be noted that the various wave forms on FIGS. 6 and 7 are identified by the identifying numerals of the electrical lines on which appear the signals corresponding to the wave forms.

The output voltage of electrical power supply 6 is now momentarily applied to the set circuit of FLIP-FLOP 10 by momentarily depressing pushbutton 8, which is connected to such set circuit by inverting amplifier 9. An output signal will appear on line 10A which will reset the FLIP-FLOP 11 to remove the signal appearing on line 11B, and will activate the encoder 2 so that there will appear on line 2A a predetermined number of pulses (typically four pulses) having a pulse repetition rate of frequency twice that of the signal theretofore appearing on line 2A, all as illustrated by the topmost wave form of FIG. 6. This signal is applied to the transmitter portion of transceiver 22 to modulate the transmitter and is communicated to the radio transmitting unit 50. After a sufficient time delay provided by delay unit 11A measured from the reset of FLIP-FLOP 11, the transmit-receive relay 4 will drop out so that no signal appears on line 3 to modulate the transmitter portion of transceiver 22. Transceiver 22 will thereupon shift to its receive mode.

Figure 8:
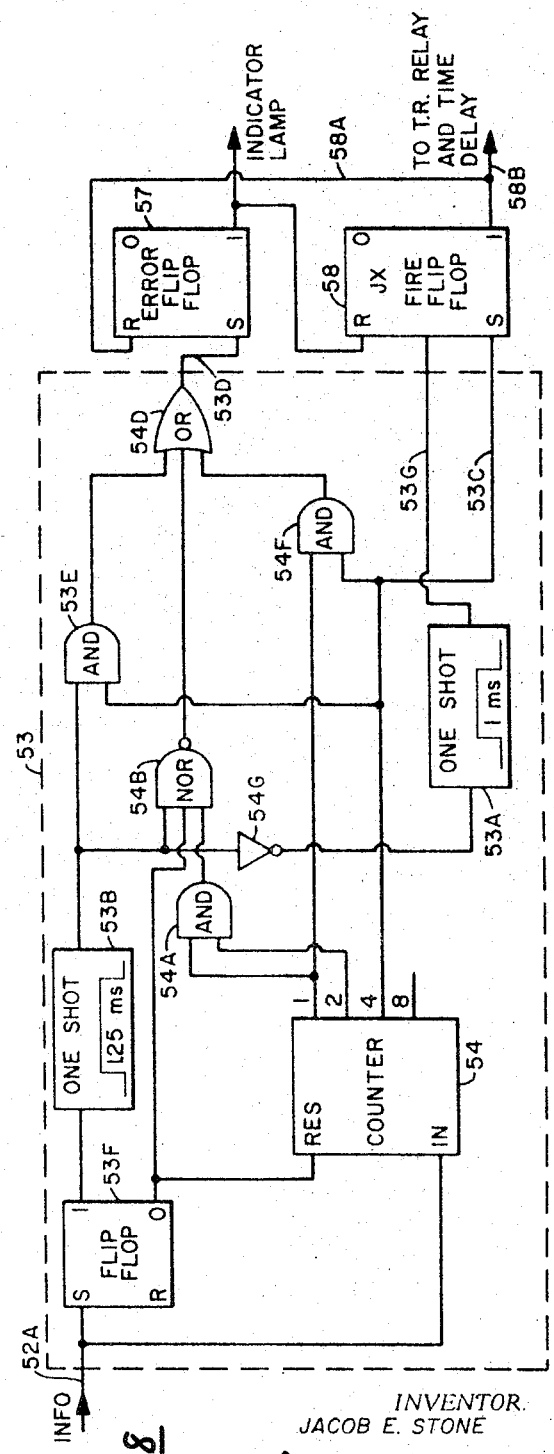
FIG. 8 is an electrical schematic diagram of a count of "n" detector.

Referring now to FIG. 3, radio transceiver 50 is initially in its receive mode such that signals received from the radio transceiver 22 appear on line 71. These signals are applied to a logarithmic or limiting volume control amplifier 51 (which may be a device as described in "Electronic Design," vol. 14, No. 29, page 86) and are applied to a waveform decoder 52 through line 51A. The signals appearing on line 71 will be distorted in transmission, as illustrated in FIG. 6, and will be reshaped in the logarithmic amplifier 51 so that signals on line 51A will have the rectangular wave shape illustrated in FIG. 7. The function of the waveform decoder 52 is to produce a series of spikes equal in number to the number of cycles or pulses appearing in the signal on line 51A and corresponding in frequency to the high-frequency pulses appearing at the output of encoder 2 on line 2A when the shoot pushbutton 8 is actuated to apply an actuating signal on line 10A for the encoder 2. As mentioned above, it is assumed that four pulses are thus produced so that four spikes will appear on line 52A as shown in FIG. 8. These spike pulses are applied to a count-of-four detector 53, the function of which is to produce a signal on line 53B should either less than four or more than four consecutive pulses of constant pulse repetition rate appear on line 52A at the output of waveform decoder 52. Should a pulse appear on line 53B, the set input of error FLIP-FLOP 57 will be activated to energize the reset circuit of FLIP-FLOP 58 so as to prevent the FLIP-FLOP from being activated by a signal applied onto the set circuit thereof on line 53C. Should no signal appear on line 53B, then the signal appearing on line 53C will trigger FLIP-FLOP 58 to energize the transmit-receive relay 59 for connecting the output of encoder 69 to the transmitter section of transceiver 50 and to energize a blaster circuit 61 through time delay circuit 60 for the purpose of detonating the exposive charge attached to the blaster circuit 61 through the cap wire 62. Blaster circuit 61 may be a model SCD2000BA manufactured by SIE Division of Dresser Industries, Inc. The output signal of the blaster circuit 61 also will be applied to the set input circuit of FLIP-FLOP 67 to energize line 67A and change the frequency of the output pulses from encoder 69 appearing on line 70. When first arrival seismic waves are detected by the uphole geophone 64, the signals will be applied to a Schmitt trigger circuit 66 through a differential amplifier 65 for the purpose of energizing the reset circuit of FLIP-FLOP 67 to change the output signals from encoder 69 to their original frequency or pulse repetition rate as illustrated in FIG. 7. The output signals of the encoder 69 are transmitted through the communications link inasmuch as energization of relay 59 has switched the transceiver 50 to its transmitting mode. Referring again to FIG. 2, these signals will be detected by the radio transceiver 22 (which is in its receive mode) and will be applied to waveform decoder 14 through line 23, logarithmic amplifier 13, and line 24. Upon reception of the signals from the transmitter of radio transceiver 50 during the interval between energization of the set and the reset circuits of FLIP-FLOP 67, waveform decoder 14 will produce spike pulses on line 25. The waveform decoder will also produce clock pulses on line 26 during the interval that radio transceiver 50 is receiving signals from radio transceiver 22. The signals produced on lines 25 and 26 will have the same pulse repetition rate. The clock pulses on line 26 and the information pulses on line 25 are in opposite time relationship; that is, the pulses appearing on line 25 trigger a monostable multivibrator 15, the output pulses of which appearing on line 15A (FIG. 6) straddle in time the clock pulses appearing on line 26. The pulses appearing on lines 15A and 26 are applied to a "NOR" circuit 16 when clock pulses only appear, the reset circuit of FLIP-FLOP 17 is energized, but when pulses concomitantly appear on lines 15A and 26, the reset circuit of FLIP-FLOP 17 is not energized. Therefore, the pulses appearing on line 25 which are applied to the set circuit of FLIP-FLOP 17 will trigger the FLIP-FLOP 17 such that a pulse having the wave shape shown in FIG. 6 will appear on line 17A during the interval that pulses are applied to the FLIP-FLOP 17 through line 25. As soon as there are no pulses on line 25, the next clock pulse applied to NOR circuit 16 through line 26 will reset FLIP-FLOP 17 so that the signal as illustrated in FIG. 7 will appear on line 20A after having been clipped by the negative clipping circuit 20. The signals appearing on lines 18A and 20A are recorded as time functions by recorder 19.

Figure 4:
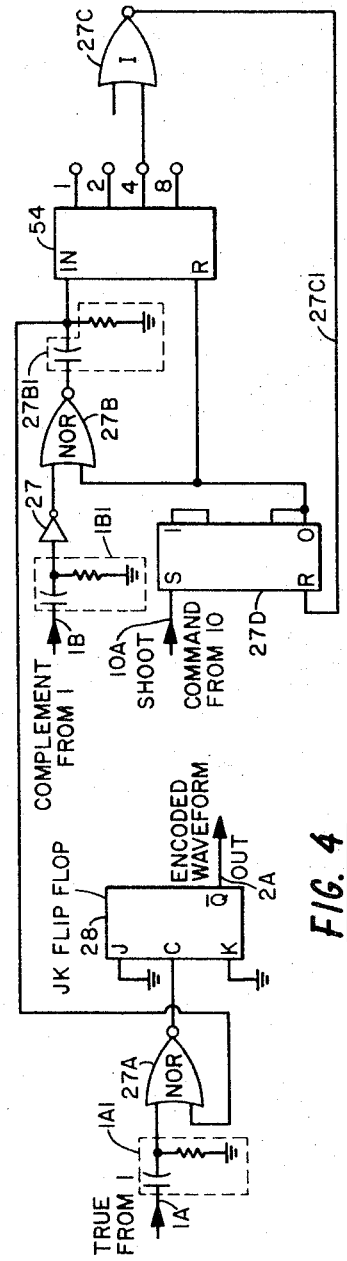
FIG. 4 is an electrical schematic diagram illustrating apparatus suitable for use as the encoders 2 and 69 in FIGS. 2 and 3.

In FIG. 4 there is illustrated suitable apparatus for use as the encoders in FIGS. 2 and 3. The encoder will be described as if it were the encoder 2 of FIG. 2. As indicated previously, two input lines are connected to the encoder from multivibrator 1, line 1A carrying the true input signal and line 1B carrying the complement input signal. Signal on line 1A is applied to NOR circuit 27A through a differentiating circuit 1A1. The NOR circuit may be a Fairchild Instrument Company model U8A991428X integrated circuit. Likewise the complement signal appearing on line 1B is applied to one input circuit of NOR circuit 27B through differentiating circuit 1B1 and inverter 27. The output signal of NOR circuit 27B is applied to the other input circuit of NOR circuit 27A through differentiating circuit 27B1. Line 10A from the shoot FLIP-FLOP 10 is applied to the set circuit of FLIP-FLOP 5 while the zero output of the FLIP-FLOP 27D is applied to one of the input circuits of NOR circuit 27B. Thus when a signal appears on line 10A the INHIBIT signal applied to the NOR circuit 27B from FLIP-FLOP 27D is removed so that pulses applied to NOR circuit 27B from line 1B, differentiator 1B1, and inverter 27 will be applied to the input of NOR circuit 27A. The signals at the output of NOR circuit 27B are very sharp spike signals as a result of the action of differentiating circuits 1B1 and 27B1. Because of the action of differentiating circuit 1A1, the signals applied to NOR circuit 27A as the result of signals appearing on line 1A are also sharp spike signals, both of the spike signals having a pulse repetition rate which is the pulse repetition rate of the output signal of multivibrator 1. Therefore, before a shoot command signal is applied to line 10A, the output signal of NOR circuit 27A will have a pulse repetition rate equal to that of the pulse repetition rate of multivibrator 1; but when the shoot command signal is applied to line 10A, the pulse repetition rate of the output signal of NOR circuit 27A will double. The output signals of NOR circuit 27A are applied to a JK FLIP-FLOP 27D is removed so that pulses applied to rate of pulses applied thereto, so that the output signal therefrom on line 2A will normally be equal to one-half the pulse repetition rate of multivibrator 1, but will be the same as the pulse repetition rate of multivibrator 1 when out-of-phase pulses are applied to NOR circuit 27A.

The output pulses of NOR circuit 27B are also applied to the set input of counter 54 which is operable to produce an output signal after a predetermined number of pulses have been registered thereby. In the instant example, an output will be applied to line 27C1 through inverter 27C when a count of four has been counted by the counter 54. This signal is applied to the reset circuit of FLIP-FLOP 5 so that, after four pulses have appeared at the output of NOR circuit 27B, FLIP-FLOP 5 is reset to prevent more pulses from appearing at the output of NOR circuit 27B as a result of the initial actuation of pushbutton 8. Thus, as a result of the actuation of pushbutton 8, the pulse train appearing on line 2A will have an initial pulse repetition rate equal to one-half that of multivibrator 1 which pulse repetition rate will double upon actuation of pushbutton 8 until four pulses have been counted thereby, and thereafter will revert to its initial pulse repetition rate.

The encoder 69 differs from the encoder described immediately above only in that counter 54, inverter 27C, and line 27C1 are eliminated. Thus pulses of double frequency will appear at the output of the circuit appearing on line 70 until Schmitt trigger 66 applies a signal to the reset circuit of FLIP-FLOP 67. It should be noted that signals on line 63 are applied to the set circuit of FLIP-FLOP 27D and that the true and complement signals are designated as 1A and 1B in FIG. 4. The output signal appearing on line 70, of course, is taken from the JK FLIP-FLOP 28.

Figure 5:
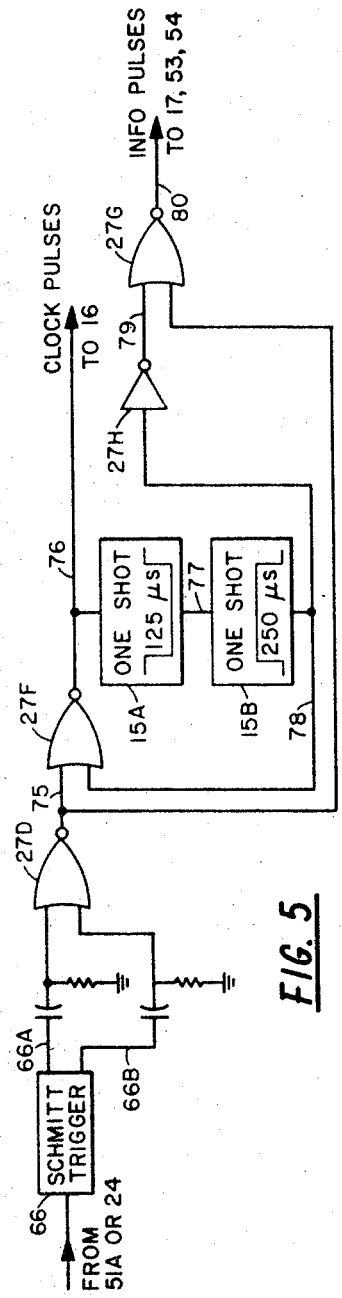
FIG. 5 is an electrical schematic diagram of apparatus suitable for use as the decoders 14 and 52 in FIGS. 2 and 3.

In FIG. 5 there is illustrated a waveform decoder suitable for use as the waveform decoders designated by the reference numerals 14 and 52. The operation of this circuit will be most readily apparent upon consideration of the waveforms of FIG. 7. It is assumed that the signals applied to the circuit from lines 24 or 51A are as described above. The signals are applied to a Schmitt trigger circuit 66 having true and complement outputs on lines 66A and 66B, the function of which is to convert the signals applied thereto to a rectangular waveform as illustrated in FIG. 7. The signals are differentiated to produce spike output signals for application to NOR circuit 27D, the output signal of NOR circuit 27D having a repetition rate which is twice the repetition rate of the signal from the output of Schmitt trigger circuit 66, and comprising a plurality of spike pulses. The spike pulses are applied to one input of NOR circuit 27F and the output signal of NOR circuit 27F is applied to a monostable multivibrator 15A having a period which is one-quarter the period between pulses applied to NOR circuit 27F. The output of monostable multivibrator 15A is applied to monostable multivibrator 15B, which produces an output pulse on line 78 at the end of each pulse appearing on line 77 and having a period equal to twice the period of the output pulse of multivibrator 15A. The output pulse of multivibrator 15B is applied to the other input of NOR circuit 27F and, as illustrated in FIG. 8, will be effective to cancel from the output of NOR circuit 27F pulses which occur in time midway between adjacent pulses normally produced by the NOR circuit 27F so that the output signal of circuit 27F can be used as a clock. Likewise, the output signal of one-shot multivibrator 15B is applied to one input circuit of NOR circuit 27G through inverter 27H. The other input circuit of NOR circuit 27G receives signals from the output of NOR circuit 27D. As can be seen in the waveforms of FIG. 7, normally the signals on line 79 from inverter 27H will cancel the output signals on line 75 from NOR circuit 27D, but when a double frequency signal appears at the output of NOR circuit 27D on line 75, a pulse will appear on line 80 for each pulse having the double repetition rate described above. Thus when the repetition rate of the signals applied to Schmitt trigger 66 doubles, a pulse will appear on line 80 for each pulse of double repetition rate applied to Schmitt trigger 66.

Illustrated in FIG. 8 is an electrical schematic diagram of a suitable "count of n" detector adapted for use in the circuit of FIG. 3. For the purposes of this description, assume that n=4 and that all FLIP-FLOPS have been reset. Assume further that a train of properly spaced pulses appears on line 52A from the waveform decoder 52. The first pulse will be applied to the set circuit of FLIP-FLOP 53F and simultaneously to the input circuit of counter 54. The output signal from FLIP-FLOP 53F will be applied to one-shot multivibrator 53B. Simultaneously the output signal from the reset output of FLIP-FLOP 53F will be removed from the reset circuit of counter 54 and NOR circuit 54B. The output signal of one-shot multivibrator 53B is of sufficient duration to cover three successive time-spaced pulses appearing on line 52A. When counter 54 counts three successive time-spaced pulses, an output signal will be produced by AND circuit 54A. Thus, the output signals of AND circuit 54A and a true output from one-shot multivibrator 53B will be applied to NOR circuit 54B and simultaneously the output of inverter 54G will be removed by the output pulse of one-shot multivibrator 53B. Signals from AND circuits 54A and 53B will be effective to keep an output from appearing at output of NOR circuit 54B, thus keeping a signal from appearing at output of OR circuit 54D, so that FLIP-FLOP 57, which may be termed an error FLIP-FLOP, will have no signal applied thereto from OR circuit 54D as the result of an output signal from NOR circuit 54B. The output signal of one-shot multivibrator 53B triggers one-shot multivibrator 53A, through inverting amplifier 54G. One-shot multivibrator 53A is triggered at the trailing edge of the pulse from the output signal of one-shot multivibrator 53B. The time duration of the signal from one-shot multivibrator 53A is sufficient to cover two successive pulses, appropriately time-spaced, from line 52A. Should four pulses be applied to counter 54 in a time period reserved for only three pulses as a result of an extraneous signal coming in from line 52A, signals will concomitantly be applied to the input of AND circuit 53E to produce an output signal from OR circuit 54D that will be effective to trigger the error FLIP-FLOP to its set condition. This will produce an output signal to the reset circuit of JK fire FLIP-FLOP 58 to prevent the fire FLIP-FLOP 58 from triggering. Simultaneously a signal will be applied to an indicator lamp circuit (not shown). The output produced by the fourth pulse countered by counter 54 is simultaneously applied to AND circuit 53E and 54F and to the set circuit of fire FLIP-FLOP 58. The output of one-shot multivibrator 53A is applied also to the toggle or clock input of fire FLIP-FLOP 58. The trailing edge of the waveform of one-shot 53A will produce a pulse after an interval equal to five equally timed spaced pulses on line 52A. Thus if only four pulses are counted by counter 54, pulses will be concomitantly applied to the toggle input and set input of fire JK FLIP-FLOP 58 to produce an output signal on line 58B to actuate the blaster circuit 61 through the time delay 60. However, if the counter 54 should count five pulses, AND circuit 54F will produce an output signal which will be applied through OR circuit 54D to actuate the error FLIP-FLOP 57 and prevent fire FLIP-FLOP 58 from being actuated. The production of a signal on line 58B will inhibit error FLIP-FLOP 57 to its reset condition. Thus extraneous signals coming through the circuit from line 52A after application of a blasting signal on line 58B will prevent the error FLIP-FLOP from being triggered to its set condition until an appropriate time interval has elapsed.

The counter circuits referred to above may be Fairchild Instrument Company model U5B995859X; the FLIP-FLOP circuits may be Fairchild Instrument Company model U8A99328X. A suitable time delay circuit is described in General Electric Transistor Manual (1944), pp. 300 to 330. Other circuit components, such as OR circuits, AND circuits, multivibrators, etc., are commerically available from Fairchild Instrument Company and are described in Fairchild Application Bulletins entitled "Application of Milliwatt Micrologic Elements" (1964).

The apparatus described above has been extensively tested under field conditions and has been found to be foolproof and reliable in operation. No premature activation of seismic explosive charges has been experienced and no accidental activation of such charges by other seismic crews operating in the same area using other types of radio frequency seismic charge activators has been experienced.

While there has been shown and described what at present is considered to be the preferred embodiment of the present invention, other modifications will be apparent to those skilled in the art which do not depart from the scope of the broadest aspects of the invention.

I claim:
1. Apparatus for controlling the activation of a seismic wave generator from a remote location from location of the seismic wave generator comprising:
 a communications link between said remote and generator locations;
 first signal generating means for normally producing an electrical signal of a first frequency and for chang- ing said signal to a second predetermined frequency for a first predetermined number of consecutive cycles responsive to an activating signal applied thereto;

means for selectively connecting the output signal of the first signal generating means to said communications link;

at said generator location, first control means connected to said communications link for activating said seismic wave generator a predetermined time interval after an electrical signal of said second predetermined frequency is received at the generator location of said communications link having said first predetermined number of consecutive cycles and for preventing activation of said generator when said signal received at said generator location has a second predetermined number of consecutive cycles greater than said first predetermined number;

and second control means connected to said signal generating means for producing an activating signal therefor.

2. The apparatus of claim 1 further including detecting means for detecting seismic waves produced by said seismic wave generator;

second signal generating means connected to said communications link for normally producing an electrical signal of a first frequency, for changing the electrical signal to a second frequency responsive to a first activating signal applied thereto, and for returning the signal to the first frequency responsive to a second activating signal applied thereto;

first circuit means connected to said signal generating means for producing said first activating signal therefor responsive to activation of said seismic wave generator;

second circuit means connected to said signal generating means and to said detecting means for producing said second activating signal therefor responsive to detection of seismic waves of at least predetermined amplitude by said detecting means;

and means at said remote location connected to said communications link for producing a first time recordation of frequency changes in the signal produced by said second signal generating means.

3. The apparatus of claim 1 wherein said first signal generating means comprises multivibrator means for producing an electrical pulse train of constant repetition rate, and second circuit means connected to said multivibrator means for normally producing an output pulse responsive to each pulse from said multivibrator means, and for producing a given number of pulses responsive to each pulse from said multivibrator means when an activating signal is applied thereto;

and wherein said control means is connected to said second circuit means for supplying said activating signal thereto.

4. The apparatus of claim 1 wherein said first control means includes first circuit means for producing a control signal when an electrical signal is received at said generator location having a first predetermined number of consecutive cycles, second circuit means connected to said first circuit means for discontinuing said control signal when the electrical signal received at said generator location has a second predetermined number of consecutive cycles greater than said first number and means in circuit relationship with said first and second circuit means for activating said generator only when the control signal is of predetermined duration.

5. The apparatus of claim 1 wherein said first control means comprises:

means for activating said seismic wave generator responsive to a control signal applied thereto;

counter means for counting cycles of the electrical signal received in the generator location, and for producing said control signal when said predetermined number of consecutive cycles is counted thereby, and means connected to said counter means and to said means for activating said seismic wave generator, for preventing activation of said seismic wave generator when said counter means counts a number of consecutive cycles greater than said predetermined number.

References Cited
UNITED STATES PATENTS 3,283,295  11/1966  Montgomery _____ 340—15.5

RODNEY D. BENNETT, Jr. Primary Examiner

C. E. WANDS, Assistant Examiner